United States Patent [19]

Tone

[11] Patent Number: 4,677,866
[45] Date of Patent: Jul. 7, 1987

[54] COUPLING SYSTEM AND DOUBLE SHAFT TRANSMISSION STRUCTURE FOR AN ARGICULTURAL TRACTOR

[75] Inventor: Masatsugu Tone, Hashimoto, Japan

[73] Assignee: Kubota Ltd., Osaka, Japan

[21] Appl. No.: 789,767

[22] Filed: Oct. 21, 1985

[30] Foreign Application Priority Data

Mar. 1, 1985 [JP] Japan ............................. 60-30096[U]
Mar. 18, 1985 [JP] Japan ............................. 60-39596[U]
Mar. 20, 1985 [JP] Japan ............................. 60-40001[U]

[51] Int. Cl.[4] .......................................... F16H 37/00
[52] U.S. Cl. .................................. 74/15.86; 464/183; 192/110 R
[58] Field of Search ................. 41/15.82, 15.86, 15.66; 192/48.8, 48.7, 110 R; 464/69, 183

[56] References Cited

U.S. PATENT DOCUMENTS 1,556,706 10/1925 Moorhouse ................. 192/110 R X
1,982,436 11/1934 Johnston ......................... 74/15.86 X
2,276,000 3/1942 Stumpf ............................... 74/15.86
2,921,449 1/1960 Jackel ............................. 464/183 X

FOREIGN PATENT DOCUMENTS 132761 4/1933 Fed. Rep. of Germany ... 192/110 R
0084244 5/1983 Japan ................................. 74/15.82
2027501 2/1980 United Kingdom ............... 74/15.86

Primary Examiner—Leslie Braun
Assistant Examiner—Wright
Attorney, Agent, or Firm—Cushman, Darby & Cushman

[57] ABSTRACT

There is disclosed a transmission structure for an agricultural tractor wherein a clutch housing and a gear transmission case are interconnected by a transmission housing formed of sheet metal. The transmission housing contains an inner and outer double shaft construction comprising a propelling system drive shaft and a power takeoff system drive shaft. These drive shafts are connected to corresponding input shafts extending from the gear transmission case by means of a ball coupling and a flange type elastic coupling, respectively.

5 Claims, 4 Drawing Figures cted to an engine and containing the double clutch construction, a transmission housing formed of sheet metal and interconnecting the clutch housing and the gear transmission case, a propelling system input shaft supported by the gear transmission case, a power takeoff system input shaft supported by the gear transmission case and constituting an inner and outer double shaft construction in combination with the propelling system input shaft, a first flexible coupling interconnecting the propelling system drive shaft and the propelling system input shaft in the transmission housing, and a second flexible coupling interconnecting the power takeoff system drive shaft and the power takeoff system input shaft in the transmission housing, wherein the first flexible coupling interconnecting said shafts which are inner shafts of the double shaft constructions comprises a ball coupling, and the second flexible coupling interconnecting said shafts which are outer shafts of the double shaft constructions comprises a flange type elastic coupling surrounding the ball coupling.

In the above transmission structure, when the transmission housing formed of sheet metal becomes distorted under a tractor weight or other loads and places the outer and inner drive shafts and input shafts out of alignment, the flexible couplings mounted in the respective drive lines will absorb the disalignments. Thus, the present invention has made it possible to incorporate a double clutch into a small agricultural tractor including a transmission housing as part of its body.

Moreover, since a ball coupling is used as the flexible coupling for the inner drive line of the double shaft construction which undergoes small flexions and a flange type elastic coupling is used as the flexible coupling for the outer drive line which undergoes greater flexions, the transmission structure of this invention has the advantage of smooth power transmission accommodating varied amounts of flexion. Besides, the couplings are formed compact and are therefore suited for mounting in a small tractor.

Other advantages of the invention will be apparent from the following description.

COUPLING SYSTEM AND DOUBLE SHAFT TRANSMISSION STRUCTURE FOR AN ARGICULTURAL TRACTOR

BACKGROUND OF THE INVENTION

This invention relates to a transmission structure for an agricultural tractor having a double clutch mechanism consisting of a propelling system clutch and a power takeoff system clutch operable in sequence, an inner and outer double shaft construction extending from the double clutch mechanism and consisting of a propelling system drive shaft and a power takeoff system drive shaft, a propelling system gear transmission housed in the gear transmission case and adapted to receive an output of the propelling system drive shaft, and a power takeoff system gear transmission housed in the gear transmission case and adapted to receive an output of the power takeoff system drive shaft.

This type of transmission structure is disclosed, for example, in a Japanese utility model application laid open or published for public inspection under No. 56-42429. In the disclosed arrangement, a tractor body comprises a gear transmission case formed of cast iron and connected to an engine, and the gear transmission case contains a double clutch and an outer and inner double drive shaft construction.

With the known arrangement noted above, the gear transmission case must have a considerable strength in order that the propelling system drive shaft and power takeoff system drive shaft in the double shaft construction contained in the gear transmission case will not be affected by a distortion of the gear transmission case due to a tractor weight. The double clutch is incorporated only into a relatively large tractor having an engine and a gear transmission case directly interconnected.

In recent years, however, it is desired to incorporate a double clutch also into a small lightweight tractor often including as part of its body a housing formed of sheet metal. With this type of small tractor, it is inevitable that the tractor body including the housing formed of sheet metal becomes distorted under a tractor weight or other loads. It is therefore practically impossible to incorporate a double clutch into a small tractor as such unless the propellng system and power takeoff system drive mechanisms are positively protected against the distortions of the tractor body.

SUMMARY OF THE INVENTION

The present invention has been made in order to permit a double clutch to be incorporated into a small agricultural tractor including a housing formed of sheet metal as part of its body.

A transmission structure for an agricultural tractor according to the invention has a double clutch mechanism consisting of a propelling system clutch and a power takeoff system clutch operable in sequence, an inner and outer double shaft construction extending from the double clutch mechanism and consisting of a propelling system drive shaft and a power takeoff system drive shaft, a propelling system gear transmission housed in a gear transmission case and adapted to receive an output of the propelling system drive shaft, and a power takeoff system gear transmission housed in a gear transmission case and adapted to receive an output of the power takeoff system drive shaft, the transmission structure comprising a clutch housing directly con-

BRIEF DESCRIPTION OF THE DRAWINGS

The drawings illustrate transmission structures for an agricultural tractor embodying this invention, in which.

DESCRIPTION OF THE PREFERRED EMBODIMENTS (First Embodiment)

Figure 1:
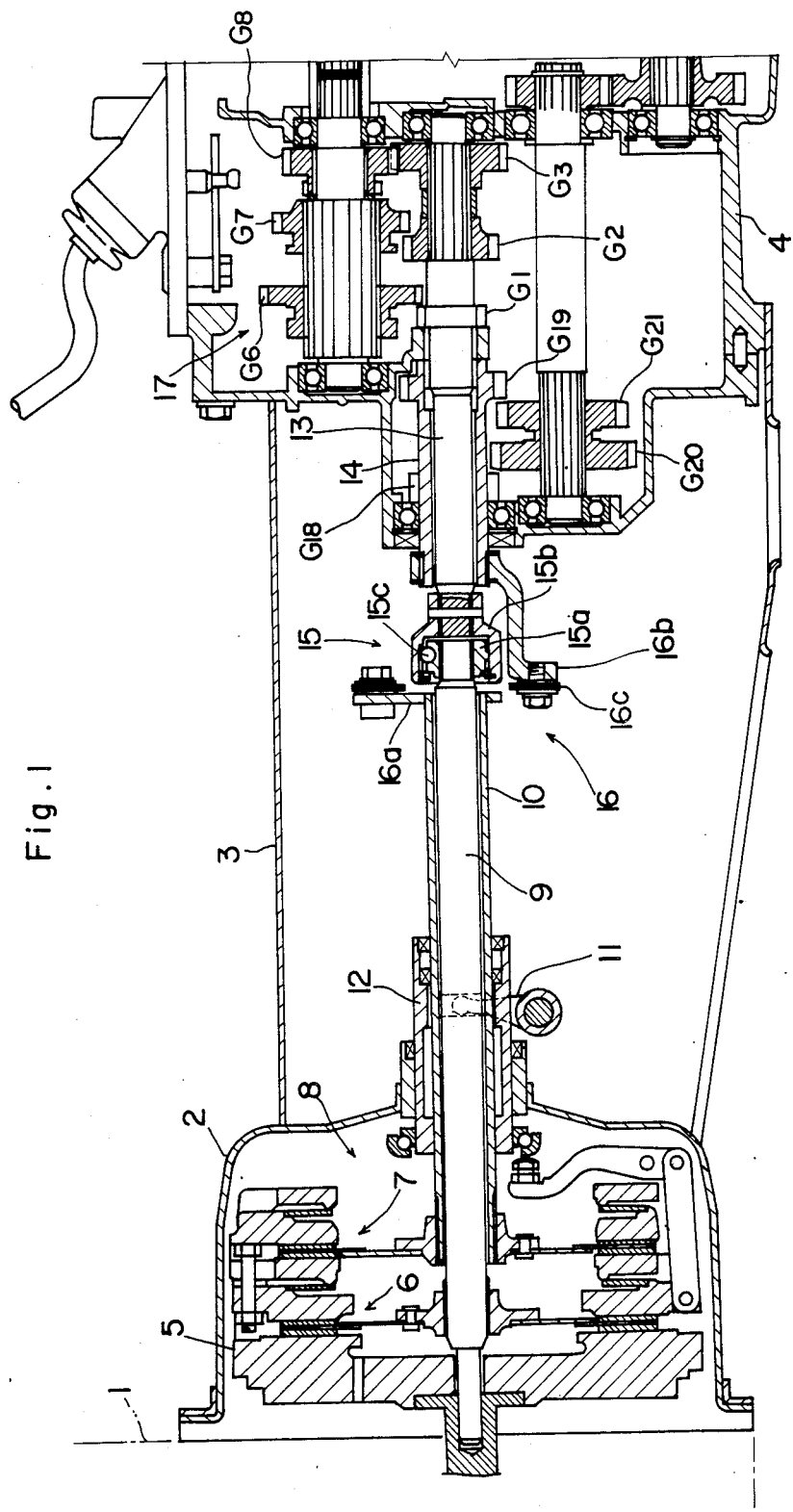
FIG. 1 is a side view in vertical section of a front half of a transmission structure according to a first embodiment.
Figure 2:
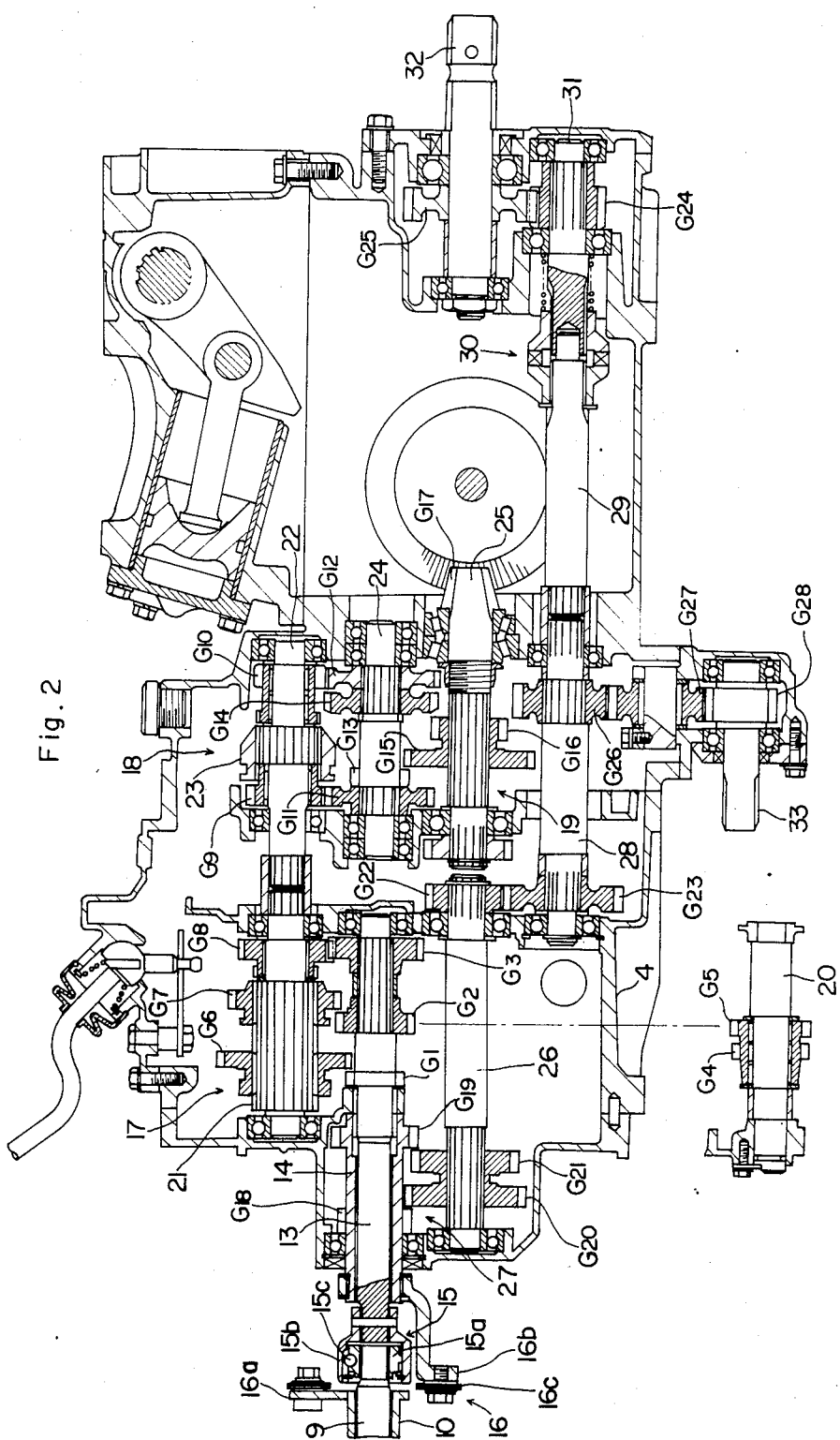
FIG. 2 is a side view in vertical section of a rear half of the transmission structure.

A transmission structure for an agricultural tractor embodying this invention is shown in FIGS. 1 and 2.

A tractor body includes an engine 1, a clutch housing 2 formed of sheet metal, a transmission housing 3 also formed of sheet metal, and a gear transmission case 4 formed of cast iron, connected to one another serially in the mentioned order. The tractor body receives loads from front and rear ground wheels.

The clutch housing 2 contains a fly wheel 5 of the engine and a double clutch mechanism 8 comprising a propelling system clutch 6 and a power takeoff system clutch 7 disposed rearwardly of the propelling system clutch 6. An inner drive shaft 9 connected to and disconnected from power output by means of the propelling system clutch 6 and an outer drive shaft 10 connected to and disconnected from power output by means of the power takeoff system clutch 7 are supported by and extend rearwardly of the clutch housing 2.

The clutch housing 2 carries a release 12 centrally of a rear end thereof, the release 12 being slidable back and forth by action of a control arm 11 linked with a clutch pedal not shown. When the clutch pedal is depressed to cause the release 12 to slide forward, the propelling system clutch 6 is disengaged first and upon further depression of the pedal the power takeoff system clutch 7 is disengaged.

A propelling system input shaft 13 and a power takeoff system input shaft 14 in an inner and outer shaft construction extend forwardly of a front face of the gear transmission case 4 to be opposed to the inner and outer drive shafts 9, 10 and connected end to end to the drive shafts 9, 10 by flexible couplings 15 and 16, respectively.

The coupling 15 for the propelling line comprises a ball coupling including an inside boss 15a and an outside boss 15b connected to each other by balls 15c and adapted for small angle inclinations. The coupling 16 for the power takeoff line comprises an elastic coupling including a flange 16a attached to the drive shaft 10 and a flange 16b attached to the input shaft 14 and connected to each other by an annular leaf spring member 16c. The ball coupling 15 is surrounded by the elastic coupling 16.

The gear transmission case 4 contains change speed gear apparatus. A change speed gear apparatus of the propelling system includes a main change speed mechanism 17 for providing three forward speeds and one backward speed, a super reduction mechanism 18 for providing two, high and low, speed ranges, and an auxiliary change speed mechanism 19, arranged in series.

The main change speed mechanism 17 comprises a first gear G1, a second gear G2 and a third gear G3 fixed to the input shaft 13, two step gears G4 and G5 loosely mounted on a reversing shaft 20, a first shift gear G6 and a second shift gear G7 splined to a second shaft 21, and a free rotation gear G8 mounted on the second shaft 21 and in constant mesh with the third gear G3. A first forward speed is provided by placing the first shift gear G6 in mesh with the first gear G1. A backward drive is provided by placing the first shift gear G6 in mesh with the back gear G4. A second forward speed is provided by placing the second shift gear G7 in mesh with the second gear G2. A third forward speed is provided by locking the second shift gear G7 to the free rotation gear G8.

The super reduction mechanism 18 comprises a first free rotation gear G9 and a second free rotation gear G10 mounted on a third shaft 22 rigidly connected to the second shaft 21, a shift sleeve 23 splined to the third shaft 22, and gears G11 and G12 fixed to a fourth shaft 24. The fourth shaft 24 is driven at a standard speed when the shift sleeve 23 is spline connected to the first free rotation gear G9 as shown, and the fourth shaft 24 is driven at a reduced speed when the shift sleeve 23 is spline connected to the second free rotation gear G10. The auxiliary change speed mechanism 19 comprises gears G13 and G14 fixed to the fourth shaft 24, and two step shift gears G15 and G16 splined to a bevel pinion shaft 25 constituting a final change speed shaft. The auxiliary change speed mechanism 19 provides a low speed when the shift gear G15 is placed in mesh with the gear G13 and a high speed when the shift gear G16 is placed in mesh with the gear G14. The bevel pinion shaft 25 is operatively connected to a rear axle differential through a bevel pinion gear G17.

The power takeoff line includes a power takeoff change speed mechanism 27 comprising a pair of gears G18 and G19 integral with a portion of the power takeoff system input shaft 14 inside the transmission case 4 and two step shift gears G20 and G21 splined to a sixth shaft 26 disposed below the input shaft 14. The shift gears G20 and G21 are selectively engageable with the gears G18 and G19 to provide two, high and low, speeds.

Output of the sixth shaft 26 of the power takeoff line is transmitted through gears G22 and G23 to a seventh shaft 28 and an eighth shaft 29 directly connected to the seventh shaft 28, and then through a torque limiter 30 to a ninth shaft 31. From the ninth shaft 31 power is transmitted through reduction gears G24 and G25 to a rear power takeoff shaft 32. Power taken from the seventh shaft 28 by way of a gear G26 is transmitted through gears G27 and G28 to an intermediate power takeoff shaft 33 mounted in a bottom portion of the transmission case 4.

(Second Embodiment)

A second embodiment which is an improvement on the first embodiment will be described hereinafter with reference to FIG. 3.

Figure 3:
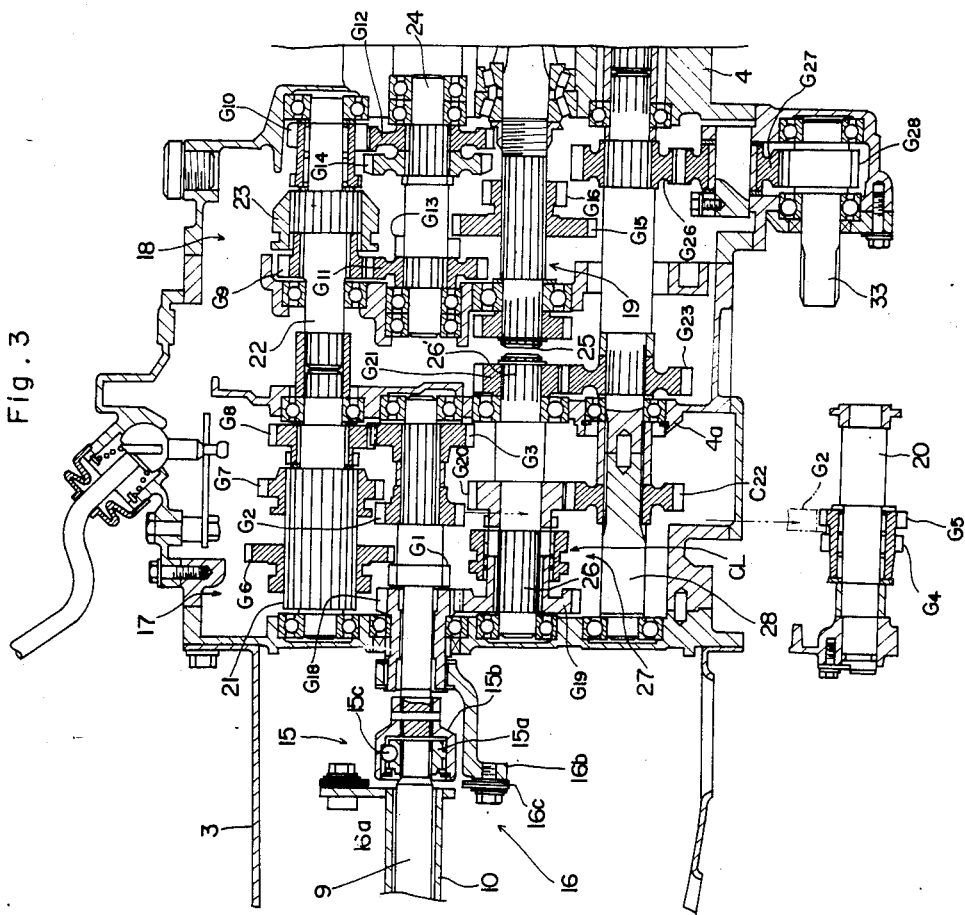
FIG. 3 is a side view in vertical section of a front half of a transmission structure according to a second embodiment.

A tractor body includes an engine 1 disposed leftward of the structure shown in FIG. 3, a clutch housing 2 formed of sheet metal and containing a double clutch mechanism 8, a transmission housing 3 also formed of sheet metal, and a gear transmission case 4 formed of cast iron, connected to one another serially in the mentioned order. The tractor body receives loads from front and rear ground wheels.

The transmission housing 3 contains an inner drive shaft 9 connected to and disconnected from power output by means of a propelling system clutch 6 and an outer drive shaft 10 connected to and disconnected from power output by means of a power takeoff system clutch 7, the two shafts 9 and 10 extending rearwardly of the clutch housing 2.

A propelling system input shaft 13 and a power takeoff system input shaft 14 in an inner and outer shaft construction extend forwardly of a front face of the gear transmission case 4 to be opposed to the inner and outer drive shafts 9 and 10 and connected end to end to the drive shafts 9 and 10 by flexible couplings 15 and 16, respectively.

The coupling 15 for the propelling line comprises a ball coupling including an inside boss 15a and an outside boss 15b connected to each other by balls 15c and adapted for small angle inclinations. The coupling 16 for the power takeoff line comprises an elastic coupling including a flange 16a attached to the drive shaft 10 and a flange 16b attached to the input shaft 14 and connected to each other by an annular leaf spring member 16c. The ball coupling 15 is surrounded by the elastic coupling 16.

The second embodiment differs from the first embodiment in that the inner and outer couplings 15 and 16 are disposed close to the gear transmission case 4. More particularly, in the first embodiment the gear transmission case 4 has the front face projecting forwardly to accommodate the gears G18 to G21 and the inner and outer couplings 15 and 16 forwardly of the projecting front face are disposed away from the transmission housing 3. Since flexions of the transmission housing 3 occur conspicuously at the junction between the transmission housing 3 and the gear transmission case 4, the couplings 15 are greatly affected by the flexions impairing smooth power transmission.

In the second embodiment the gear transmission case 4 is adapted to accommodate the change speed gear mechanisms without projecting its front face as described later. This construction permits the couplings to be disposed close to the front face of the transmission case 4, whereby the flexions of the transmission housing 3 do not act on the couplings 15 and 16 in any substantial manner.

The gear transmission case 4 contains change speed apparatus. A change speed apparatus of the propelling system includes a main change speed mechanism 17 for providing three forward speeds and one backward speed, a super reduction mechanism 18 for providing two, high and low, speed ranges, and an auxiliary change speed mechanism 19, arranged in series. Each of these mechanisms 17, 18 and 19 is substantially the same as its counterpart in the first embodiment and therefore is not particularly described here.

The power takeoff line includes a power takeoff change speed mechanism 27 comprising a power takeoff change speed shaft 26 extending through and supported by an inside partition wall 4a of the transmission case 4 to be parallel to the propelling system input shaft 14. The change speed shaft 26 carries an input gear 19G mounted for free rotation thereon and in constant mesh with a gear 18G mounted on the power takeoff system input shaft 14. The change speed shaft 26 further carries a small change speed gear 21G splined to a portion 26' thereof extending from the partition wall 4a and a large change speed gear 20G freely rotatably mounted thereon adjacent the input gear 19G. A spline claw clutch CL is provided which is selectively engageable with the input gear 19 and the large free rotation gear 20G including a neutral position, whereby power from the input gear 19G is selectively transmitted to the change speed shaft 26 and to the free rotation gear 20G. A front power takeoff shaft 28 parallel to the change speed shaft 26 carries large and small gears 22G and 23G rotatable in unison therewith and in constant mesh with the large and small change speed gears 20G and 21G. Thus, the change speed mechanism 27 provides two, high and low, power takeoff speeds.

Output of the change speed shaft 26 of the power takeoff line is transmitted through the power takeoff change speed mechanism 27 to the front power takeoff shaft 28 and to an intermediate power takeoff shaft 29 directly connected to the front power takeoff shaft 28, and then through a one-way clutch to a rear power takeoff shaft. From the rear power takeoff shaft power is transmitted through reduction gears to a power takeoff output shaft. Power taken from the front power takeoff shaft 28 by way of a gear G26 is transmitted through gears G27 and G28 to a second power takeoff output shaft 33 mounted in a bottom portion of the gear transmission case 4.

As described above, the change speed shaft 26 of the power takeoff change speed mechanism 27 extends through the inside partition wall 4a and one of the change speed gears 21G is mounted on the portion 26' of the change speed shaft 26 projecting from the partition wall 4a, the other change speed gear 20G being mounted on the shaft 26 opposite the gear 21G across the partition wall 4a. This arrangement enables the power takeoff change speed mechanism 27 to be transferred into a narrow space inside the gear transmission case 4. At the same time, the claw clutch CL is provided to minimize an amount of sliding movement inside the narrow space, whereby the power takeoff change speed mechanism 27 occupies a minimum space in the transmission case 4.

Therefore, the power takeoff change speed mechanism 27 employing the gears 20G and 21G having large widths is contained in the transmission case 4 proper. This permits the universal or flexible couplings 15 and 16 for the drive shafts 9 and 10 connecting the clutches to the transmission to be disposed close to the junction between the front face of the tranmission case 4 and the transmission housing 3 formed of sheet metal. Thereby power transmission is smoothly effected with a minimum angle of flexion proximate to flexions of the transmission housing 3 formed of sheet metal. At the same time, the power takeoff change mechanism 27 having good durability is contained in a compact manner in the transmission case 4 without necessitating a substantial modification thereto.

(Third Embodiment)

A third embodiment which is an improvement on the second embodiment will be described hereinafter with reference to FIG. 4.

Figure 4:
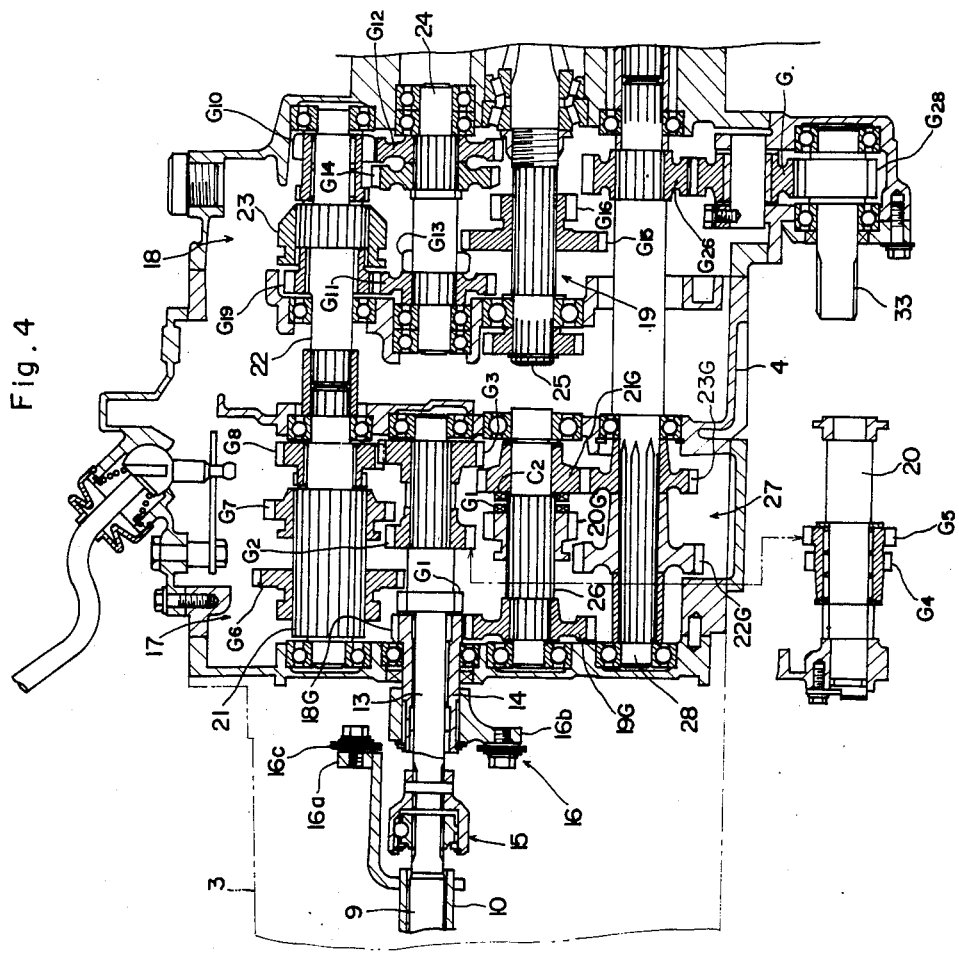
FIG. 4 is a side view in vertical section of a front half of a transmission structure according to a third embodiment.

A tractor body includes an engine disposed leftward of the structure shown in FIG. 4, a clutch housing formed of sheet metal, a transmission housing 3 also formed of sheet metal, and a gear transmission case 4 formed of cast iron, connected to one another serially in the mentioned order. The tractor body receives loads from front and rear ground wheels.

The transmission housing 3 contains an inner drive shaft 9 connected to and disconnected from power output by means of a propelling system clutch and an outer drive shaft 10 connected to and disconnected from power output by means of a power takeoff system clutch, the two shafts 9 and 10 extending rearwardly of the clutch housing.

A propelling system input shaft 13 and a power takeoff system input shaft 14 in an inner and outer shaft construction extend forwardly of a front face of the gear transmission case 4 to be opposed to the inner and outer drive shafts 9 and 10 and connected end to end to the drive shafts 9 and 10 by flexible couplings 15 and 16, respectively.

The coupling 15 for the propelling line comprises a ball coupling including an inside boss 15a and an outside boss 15b connected to each other by balls 15c and adapted for small angle inclinations. The coupling 16 for the power takeoff line comprises an elastic coupling including a flange 16a attached to the drive shaft 10 and a flange 16b attached to the input shaft 14 and connected to each other by an annular leaf spring member 16c. The ball coupling 15 is surrounded by the elastic coupling 16.

The third embodiment differs from the preceding embodiments particularly in that the flange 16a on the drive shaft 10 for supporting the leaf spring member 16c is supported by an arm member 16d extending from the drive shaft 10 toward the gear transmission case 4. This construction enables flexions of the transmission housing 3 tending to occur adjacent the junction between the transmission housing 3 and the gear transmission case 4 to be absorbed by the leaf spring member 16c in a more reduced state than in the second embodiment, whereby power transmission is effected with greater smoothness.

The gear transmission case 4 contains change speed apparatus. A change speed apparatus of the propelling system includes a main change speed mechanism 17 for providing three forward speeds and one backward speed, a super reduction mechanism 18 for providing two, high and low, speed ranges, and an auxiliary change speed mechanism 19, arranged in series. Each of these mechanisms 17, 18 and 19 is substantially the same as its counterparts in the first and second embodiments and therefore is not particularly described here.

The power takeoff line includes a power takeoff change speed mechanism 27 comprising a power takeoff change speed shaft 26 supported parallel to the propelling system input shaft 14 and carrying a gear 19G splined to be rotatable in unison therewith, the gear 19b being in constant mesh with a gear 18G mounted on the power takeoff system input shaft 14. The change speed shaft 26 further carries large and small gears 20G and 21G, the small gear 20G being splined to the shaft 26 and the large gear 21G being freely rotatably mounted on the shaft 26. The large and small gears 20G and 21G includes clutch claws C1 and C2, respectively. A front power takeoff shaft 28 parallel to the change speed shaft 26 carries a large gear 22G splined thereto and engageable with the small gear 20G splined to the change speed shaft 26, and a small gear 23G splined thereto and in constant mesh with the large gear 21G freely rotatably mounted on the change speed shaft 26. Thus, the change speed mechanism 27 provides two speeds by sliding the small gear 20G on the change speed shaft 26, a low speed being provided when power is transmitted from the gear 19G through the change speed shaft 26 to the large gear 22G, and a high speed being provided when power is transmitted from the gear 19G through the clutch claws C1 and C2 to the small gear 23G.

Output of the change speed shaft 26 of the power takeoff line is transmitted through the power takeoff change speed mechanism 27 to the front power takeoff shaft 28 and to an intermediate power takeoff shaft 29 directly connected to the front power takeoff shaft 28, and then through a one-way clutch to a rear power takeoff shaft. From the rear power takeoff shaft power is transmitted through reduction gears to a power takeoff output shaft. Power taken from the front power takeoff shaft 28 by way of a gear G26 is transmitted through gears G27 and G28 to a second power takeoff output shaft 33 mounted in a bottom portion of the gear trransmission case 4.

The described construction employs the two gears 20G and 21G in place of an integral large and small gear unit used in the prior art, one of the gears 21G being freely rotatably mounted on the change speed shaft 26 and the other gear 20G being splined to the shaft 26. One of the gears being axially slidable to come into engagement with the other through the clutch claws C1 and C2 as described. A sum of an amount of sliding of only one of the gears to bring it into engagement with another gear and an amount of sliding to cause engagement of the clutch claws is shorter than an amount of sliding of the conventional gear unit including a neutral position. In other words, the described embodiment requires only a small space for the change speed gear operation.

As a result, a large space is provided on the power takeoff change speed shaft 26 permitting the gears on the shaft 26 to have large width. This has the advantages of safe power transmission and of preventing damage to the gears.

What is claimed is:

1. A transmission structure for an agricultural tractor having an engine and a double clutch mechanism including a propelling system clutch and a power takeoff system clutch operable in sequence, an inner and outer double shaft construction extending from the double clutch mechanism and including a propelling system drive shaft and a power takeoff system drive shaft surrounding said propelling system drive shaft, a gear transmission case, a propelling system gear transmission housed in said gear transmission case for receiving the output of the propelling system drive shaft, and a power takeoff system gear transmission housed in the gear transmission case for receiving the output of the power takeoff system drive shaft, said transmission structure comprising:

a clutch housing adapted to be directly connected to the engine and containing, a transmission housing formed of sheet metal and interconnecting the clutch housing and the gear transmission case, a propelling system input shaft supported by the gear transmission case, a power take off system input shaft supported by the gear transmission case and surrounding said propelling system input shaft so as to provide an inner and outer double shaft construction, a ball coupling interconnecting the propelling system drive shaft and the propelling system input shaft which are inner shafts of the double shaft construction in the transmission housing, and a flange type elastic coupling interconnecting the power takeoff system drive shaft and the power takeoff system input shaft which are outer shafts of the double shaft construction in the transmission housing.

2. A transmission structure as claimed in claim 1 wherein said flange type elastic coupling is disposed so as to surround said ball coupling.

3. A transmission structure as claimed in claim 2 wherein said ball and flange type elastic couplings are disposed adjacent a junction between the transmission housing and the gear transmission case.

4. A transmission structure as claimed in claim 3 wherein the gear transmission case includes a planar front face.

5. A transmission structure as claimed in claim 3 wherein said flange type elastic coupling comprises an annular leaf spring member.

* * * * *